United States Patent [19]

Oda et al.

[11] 3,865,873

[45] Feb. 11, 1975

[54] PROCESS FOR PREPARING ACRYLIC ACID AND OR METHACRYLIC ACID FROM ACROLEIN OR METHACROLEIN

[75] Inventors: Yoshio Oda; Keiichi Uchida; Takeshi Morimoto, all of Yokohama, Japan

[73] Assignee: Asahi Glass Co., Inc., Tokyo, Japan

[22] Filed: Oct. 20, 1972

[21] Appl. No.: 299,383

[30] Foreign Application Priority Data

| Oct. 22, 1971 | Japan | 46-83343 |
| Dec. 16, 1971 | Japan | 46-101456 |
| Mar. 7, 1972 | Japan | 47-22756 |
| Mar. 7, 1972 | Japan | 47-22757 |

[52] U.S. Cl. .............. 260/530 N, 252/437
[51] Int. Cl. ............................... C07c 57/04
[58] Field of Search ............... 260/530 N, 533 N

[56] References Cited
UNITED STATES PATENTS

| 3,087,964 | 4/1963 | Koch et al. | 260/530 N |
| 3,230,248 | 1/1966 | Yamagita et al. | 260/530 N |
| 3,280,182 | 10/1966 | Gasson et al. | 260/530 N |
| 3,322,693 | 5/1967 | Bethell et al. | 260/530 N |
| 3,365,489 | 1/1968 | Bethell et al. | 260/530 N |
| 3,435,069 | 3/1969 | Bethell et al. | 260/530 N |
| 3,544,624 | 12/1970 | Anderson et al. | 260/530 N |
| 3,557,199 | 1/1971 | Parthasarathy et al. | 260/530 N |
| 3,639,269 | 1/1972 | Koberstein et al. | 260/530 N |
| 3,761,424 | 9/1973 | Koberstein et al. | 260/530 N |

FOREIGN PATENTS OR APPLICATIONS

| 41-1407 | 2/1966 | Japan | 260/533 N |
| 41-14900 | 8/1966 | Japan | 260/530 N |

*Primary Examiner*—Lorraine A. Weinberger
*Assistant Examiner*—Richard D. Kelly
*Attorney, Agent, or Firm*—Oblon, Fisher, Spivak, McClelland & Maier

[57] ABSTRACT

A process for preparing acrylic acid or methacrylic acid which comprises reacting acrolein or methacrolein with molecular oxygen in the presence of a catalyst consisting essentially of (a) molybdenum, (b) phosphorus, (c) at least one element selected from the group consisting of niobium, tantalum and titanium, and (d) oxygen, as the essential components, and (e) at least one element selected from the group consisting of tin, nickel, magnesium, tungsten, bismuth and iron, as an optional component.

7 Claims, No Drawings

PROCESS FOR PREPARING ACRYLIC ACID AND OR METHACRYLIC ACID FROM ACROLEIN OR METHACROLEIN

BACKGROUND OF THE INVENTION

1. Field of the Invention

This invention relates to a process for preparing acrylic acid or methacrylic acid by the catalytic vapor phase oxidation of acrolein or methacrolein. More particularly, the invention relates to a process for preparing methacrylic acid from methacrolein, characterized mainly by the use of novel catalysts.

2. Description of Prior Art

Conventionally, many catalysts useful for the preparation of unsaturated carboxylic acids having from three to four carbon atoms by the catalytic vapor phase oxidation of the corresponding unsaturated aldehydes with molecular oxygen have already been proposed. Some of those catalysts are excellent for preparing acrylic acid from acrolein and have been used for the large scale production of acrylic acid. Various catalysts for preparing methacrylic acid from methacrolein have also been proposed. However, by the use of those catalysts the methacrylic acid has not been produced from methacrolein commercially because of the low yield. This is because methacrolein is more combustible than acrolein, and being subjected to complete oxidation to carbon monoxide and/or carbon dioxide rather than to partial oxidation to the desired product. Thus up to the present, an excellent catalyst used for the preparation of methacrylic acid has not yet been found.

Catalyst in the U.S. Pat. Nos. 3,358,020 and 3,435,069, for example, showed the excellent performance for the production of acrylic acid (the conversion of acrolein is 96 ~ 100%, the selectivity of acrylic acid is 80 ~ 90%), but not for the production of methacrylic acid (the conversion of methacrolein is 29 ~ 63%, the selectivity of methacrylic acid is 11 ~ 41%).

SUMMARY OF THE INVENTION

It is an object of this invention to provide a method for not only preparing methacrylic acid in superior yield in comparison with prior arts, but also preparing acrylic acid in a superior yield.

Another object is to provide a novel catalyst for the preparation of unsaturated carboxylic acids from corresponding unsaturated aldehydes and a method for the preparation thereof.

Other objects and advantages of the present invention will become apparent to those skilled in the art from the following description and disclosure.

This invention provides a process for preparing acrylic acid or methacrylic acid by the oxidation of acrolein or methacrolein with molecular oxygen in vapor phase at a temperature of from 250° to 450°C, in the presence of a catalyst consisting of (a) molybdenum, (b) phosphorus, (c) at least one element selected from the group consisting of niobium, tantalum and titanium, and (d) oxygen, as the essential components, and (e) at least one element selected from the group consisting of tin, nickel, magnesium, tungsten, bismuth and iron, as an optional component.

According to the process of the invention, in preparing methacrylic acid from methacrolein, for example, the conversion of methacrolein and the selectivity of methacrylic acid were 60 ~ 70% and 75 ~ 83%, respectively and also in preparing acrylic acid from acrolein, the conversion of acrolein and the selectivity of acrolein acid were 95 ~ 100% and 80 ~ 85%, respectively.

Catalysts are capable of having the desired catalytic activity, only when the catalysts contain all the essential components. When catalysts lack any one or two components of essential ones, the activity of such catalysts is remarkably low, producing small amounts of the desired unsaturated carboxylic acids. Thus these catalysts are unsatisfactory for the commercial application.

So far as the catalysts of this invention contain all the essential components above, they have considerably good catalytic activity, preferably in case of assigning the number of molybdenum atoms as 12, the catalysts having the following empirical formula show superior catalytic activity:

$$Mo_{12}-P_\alpha - X_\beta - O_\gamma$$

wherein X is at least one element selected from the group consisting of Nb, Ta and Ti; $\alpha$ is a number of 0.1 to 5, preferably 0.2 to 3; $\beta$ is a number of 0.1 to 10, preferably 0.3 to 5; $\gamma$ is decided on the basis of oxidized states of Mo, P and X, and when each component is in highly oxidized state, $\gamma$ is a number of 37 to 81.

In particular, the preferred catalysts of this invention may be expressed in the following three formulas:

$$Mo_{12}-P_\alpha -Nb_\beta -O_\gamma$$

wherein $\alpha$ is a number of 0.3 to 3; $\beta$ is a number of 0.5 to 3; $\gamma$ is a number of 37 to 56.

$$Mo_{12}-P_\alpha -Ta_\beta -O_\gamma$$

wherein $\alpha$ is a number of 0.5 to 2; $\beta$ is a number of 0.5 to 3; $\gamma$ is a number of 34 to 81.

$$Mo_{12}-P_\alpha -Ti_\beta -O_\gamma$$

wherein $\alpha$ is a number of 0.2 to 3; $\beta$ is a number of 0.3 to 5; $\gamma$ is a number of 37 to 54.

In addition to the essential components above, the catalysts of this invention may contain at least one element selected from the group consisting of Sn, Ni, Mg, W, Bi and Fe, thereby improving their catalytic activity. These elements are not essential components but optional components.

When the catalysts of this invention contain the optional components above, their preferred empirical formula may be expressed as follows:

$$Mo_{12}-P_\alpha -X_\beta -Y_\delta -O_\epsilon$$

wherein X is at least one element selected from the group consisting of Nb, Ta and Ti; Y is at least one element selected from the group consisting of Sn, Ni, Mg, W, Bi and Fe; $\alpha$ is a number of 0.1 to 5, preferably 0.2 to 3; $\beta$ is a number of 0.1 to 10, preferably 0.3 to 5; $\delta$ is a number of 0.1 to 10, preferably 0.5 to 3; $\epsilon$ is decided on the basis of oxidized states of Mo, P, X and Y, and when each component is in highly oxidized state, $\epsilon$ is a number of 38 to 111.

The foregoing catalysts of this invention may contain any further elements unless they injure the catalytic activity.

The catalysts of this invention may be prepared by several methods. Preferably, the catalysts may be prepared by concentrating a solution or a suspension containing the requested components, followed by drying the resulting concentrate. Thereafter, preferably the dried product is calcined at a temperature of from 250° to 450°C, for about 1 to about 48 hours in art. Then, the calcination product is ground into the size of 5 mesh to 100 mesh suitable for use. Thus prepared catalyst have 0.1 to 50 m²/g of a specific surface area.

In some cases, in order to improve the physical property of the catalysts, it is preferred to support the catalysts on a suitable carrier, such as, silica, silicacontaining-materials, silicon carbide, alumina and the like. The amount of the carrier used is preferably in the range of 30 to 97% by weight based on the supported catalysts.

The exact chemical structure of the catalysts of this invention is not clear. However, it can be presumed, that the catalyst may be a homogeneous mixture of oxides of all the components, or may be a compound or a complex formed by means of the mutual reaction of salt of molybdenum and phosphorus, and the oxides of the other components.

The starting materials of each component used for the preparation of the catalysts of this invention are as follows: As a molybdenum source, ortho-, meta- or para-molybdic acid, ortho-, meta- or paramolybdates heteromolybdic acid, heteromolybdates, molybdenum oxide or the like, preferably ammonium paramolybdate may be used. As a phosphorus source, phosphoric acid, phosphates, polyphosphoric acid, polyphosphates may be used. Phosphomolybdates may effectively be used as a common starting material for molybdenum and phosphorus source. As a niobium source, niobium oxide, niobium hydroxide, niobium oxalate or the like; as a tantalum component, tantalum pentoxide, tantalum oxalate or the like; as a titanium source, titanium trichloride, titanium dichloride, titanium nitrate oxide, titanium dioxide or the like; as a tin source, tin oxide, tin chloride or the like; as a tungsten source, tungsten trioxide, tungstic acid, tungstates or the like; as a bismuth source, bismuth nitrate, bismuth oxide or the like; as an iron source, iron nitrate, iron chloride or the like; as a magnesium source, magnesium nitrate, magnesium chloride or the like; as a nickel source, nickel nitrate, nickel chloride or the like; may effectively be used, respectively.

The essential reactants of this invention are unsaturated aldehyde, namely, acrolein or methacrolein and molecular oxygen which may be pure oxygen, oxygen diluted with inert gases oxygen enriched air or air without additional oxygen. In view of economy, air is the most practical source of molecular oxygen.

The reaction of this invention may be carried out in either a fixed or fluidized catalyst bed. The reaction temperature may vary within the range from 250° to 450°C, preferably from 300° to 400°C. The reaction pressure may vary within the range of from 0.5 to 40 atmospheres absolute, preferably from about 1 to 10 atmospheres absolute. When the reaction pressure is relatively higher within said range, the reaction temperature may be somewhat lower within said range.

The contact time may be usually from 0.2 to 30 seconds, preferably from 1 to 20 seconds.

The molar ratio of oxygen to unsaturated aldehydes in the feed gas supplied to the reactor may usually be from 1:10 to 10:1, preferably from 1:3 to 3:1.

Steam may be added to the gaseous reactant mixture above, thereby improving the yield of unsaturated carboxylic acids. Further, nitrogen, saturated hydrocarbons, such as, methane, propane, butane or the like, or other inert gas may be also added to said gaseous reactant mixture. The concentration of the steam may vary within the range from 2 to 80%, preferably from 10 to 50% by volume of the feed.

Since the reaction of this invention is exothermic, the temperature within the reactor must be regulated in order to control the reaction. Thus, it is preferred that the reactor is placed in a fluidized solid bath, a molten salt bath or a metal bath.

The methacrylic acid or acrylic acid may be recovered from the reaction products by any conventional methods, for example, by condensation or extraction with water followed by distillation.

Wherein the following definitions are applied to the conversion of unsaturated aldehydes, and the selectivity and the yield of unsaturated carboxylic acids. All the analyses were conducted by means of gas chromatography.

$$\text{Conversion (percent)} = \frac{\text{Unsaturated aldehyde in the feed (mole)} - \text{Unsaturated aldehyde in the effluent (mole)}}{\text{Unsaturated aldehyde in the feed (mole)}} \times 100$$

$$\text{Selectivity (percent)} = \frac{\text{Unsaturated carboxylic acid in the effluent (mole)}}{\text{Unsaturated aldehyde in the feed (mole)} - \text{Unsaturated aldehyde in the effluent (mole)}} \times 100$$

Yield (percent) = Conversion × Selectivity × 1/100

The process of the invention is further illustrated by the following examples.

A series of experiments was conducted with a U-shaped stainless steel reactor 400 mm long and of 6 mm inner diameter. The reactor was filled with 4 ml of a catalyst which was made according to each of following examples. The reactor was put into a molten potassium nitrate bath heated at the reaction temperature. The reactant gaseous mixture was fed into said reactor and the effluent from said reactor was led to a condenser cooled with a dry-ice ethanol bath. The uncondensed gas was analyzed by means of gas chromatography. While the condensate containing an unsaturated aldehyde and an unsaturated acid was also analyzed by means of gas chromatography.

EXAMPLE I 23.1 grams of 85% orthophosphoric acid dissolved in 50 ml of water were added, under stirring, to a liquid which dissolved 423 grams of ammonium paramolybdate, $(NH_4)_6Mo_7O_{24}\cdot 4H_2O$, in 700 ml of water 26.6 grams of niobium pentoxide, $Nb_2O_5$, suspended in 100 ml of nitric acid aqueous solution (1:1) was added to the mixture liquid above. Then, the resulting liquid was concentrated by means of heating under stirring, followed by drying of the resulting slurry at 120°C for 16 hours. Thereafter, the dried product was calcined at 400°C for 12 hours, whereby a solid having the following atomic ratio of the elements was obtained.

$Mo_{12}P_1Nb_1O_{41}$

Said solid was sieved to collect a catalyst within the range of 35 to 100 mesh size. The aforementioned U-shaped reactor was filled with 4 ml of the obtained catalyst. The reactor was put into the molten salt bath heated at 340°C. A reactant gaseous mixture composed of 5% of methacrolein, 9% of oxygen, 32% of steam and 54% of nitrogen, the percentages being by volume, was passed through the reactor with a contact time of 2 seconds. The following results were obtained:
The conversion of methacrolein: 62.5%
The selectivity of methacrylic acid: 73.8%
The selectivity of acetic acid: 8.2%

EXAMPLES 2-5

Catalysts were prepared in the similar way to that of Example 1, except that the starting materials were adjusted so as to maintain the atomic ratios given in Table 1. The catalysts were used for the oxidation of methacrolein under substantially the same conditions as those employed in Example 1. The results obtained are given in Table 1:

Table 1

| Ex. Nos. | Catalysts | Methacrolein conversion (%) | Methacrylic acid selectivity (%) | Acetic acid selectivity (%) |
|---|---|---|---|---|
| 2 | $Mo_{12}P_1Nb_3O_{46}$ | 53.7 | 63.1 | 7.4 |
| 3 | $Mo_{12}P_3Nb_1O_{46}$ | 32.2 | 72.2 | 6.1 |
| 4 | $Mo_{12}P_1Nb_7O_{56}$ | 43.8 | 49.5 | 8.3 |
| 5 | $Mo_{12}P_5Nb_1O_{51}$ | 16.1 | 78.3 | 5.3 |

REFERENCE EXAMPLES 1~5

Catalysts were prepared in the similar way to that of Example 1, except that the starting materials were adjusted so as to maintain the atomic ratios given in Table 2. As iron and nickel components, nitrates were used, respectively. The catalysts were used for the oxidation of methacrolein under substantially the same conditions as employed in Example 1. The results obtained were given in Table 2:

Table 2

| Ref. ex. Nos. | Catalysts | Methacrolein conversion (%) | Methacrylic acid selectivity (%) | Acetic acid selectivity (%) |
|---|---|---|---|---|
| 1 | $Mo_{12}Nb_1O_{38.5}$ | 23.5 | 19.3 | 6.9 |
| 2 | $Mo_{12}P_1O_{38.5}$ | 26.3 | 32.4 | 3.7 |
| 3 | $Mo_{12}Nb_1Fe_1O_{40}$ | 32.1 | 12.5 | 4.3 |
| 4 | $Mo_{12}P_1Fe_1O_{40}$ | 40.0 | 18.7 | 9.2 |
| 5 | $Mo_{12}Nb_1Ni_1O_{39.5}$ | 33.4 | 25.6 | 7.7 |

EXAMPLES 6-10

Catalysts were prepared in the similar way to that of Example 1, except that the starting materials were adjusted so as to maintain the atomic ratios given in Table 3. The catalysts were used for the oxidation of acrolein under the same conditions as employed in Example 1, except that the reaction temperature was 360°C. The results obtained were given in Table 3.

Table 3

| Ex. Nos. | Catalysts | Acrolein conversion (%) | Acrylic acid selectivity (%) | Acetic acid selectivity (%) |
|---|---|---|---|---|
| 6 | $Mo_{12}P_1Nb_1O_{41}$ | 81.3 | 85.5 | 2.9 |
| 7 | $Mo_{12}P_1Nb_3O_{46}$ | 65.1 | 78.2 | 3.7 |
| 8 | $Mo_{12}P_3Nb_1O_{46}$ | 45.9 | 83.7 | 3.1 |
| 9 | $Mo_{12}P_1Nb_7O_{56}$ | 42.5 | 61.3 | 4.2 |
| 10 | $Mo_{12}P_5Nb_1O_{51}$ | 20.7 | 81.3 | 2.9 |

EXAMPLE 11

23.1 grams of 85% orthophosphoric acid dissolved in 50 ml of water were added, under stirring, to the liquid in which was dissolved 423 grams of ammonium paramolybdate in 700 ml of water. 97.0 grams of bismuth nitrate, $Bi(NO_3)_3.5H_2O$, dissolved in 300 ml of nitric acid (1:1) was added all at once to the mixture liquid above under stirring and further, 26.6 grams of niobium pentoxide suspended in 100 ml of nitric acid (1:1) was added to the resulting liquid. Then, the resulting mixture liquid was concentrated by heating under stirring, followed by drying of the obtained slurry at 120°C for 16 hours. Thereafter, the dried product was calcined at 400°C for 12 hours, whereby a solid having the following atomic ratio of elements was obtained.

$Mo_{12}P_1Nb_1Bi_1O_{42.5}$

Said solid was sieved to collect a catalyst within the range of 35 to 100 mesh size. The aforementioned U-shaped reactor was filled with 4 ml of the obtained catalyst. The catalysts were used in the oxidation of methacrolein under substantially the same conditions as those employed in Example 1. The following results were obtained:
The conversion of methacrolein: 82.5%
The selectivity of methacrylic acid: 75.6%
The selectivity of acetic acid: 7.3%

EXAMPLES 12~45

Catalyst were prepared in the similar way to that of Example 11, except that the starting materials were adjusted so as to maintain the atomic ratios given in Table 4. As iron, nickel and magnesium components, nitrates; as a tin component, oxide and as a tungsten component, ammonium tungstate were used, respectively. The catalysts were used in the oxidation of methacrolein under substantially the same conditions as those employed in Example 11. The results obtained were given in Table 4.

Table 4

| Example Nos. | Catalysts | Methacrolein conversion (%) | Methacrylic acid selectivity (%) | Acetic acid selectivity (%) |
|---|---|---|---|---|
| 12 | $Mo_{12}P_1Nb_1Bi_3O_{45.5}$ | 80.1 | 59.6 | 10.1 |
| 13 | $Mo_{12}P_1Nb_3Bi_1O_{47.5}$ | 76.8 | 72.7 | 7.7 |
| 14 | $Mo_{12}P_3Nb_1Bi_1O_{47.5}$ | 57.2 | 52.7 | 11.4 |
| 15 | $Mo_{12}P_1Nb_1Bi_9O_{54.5}$ | 39.3 | 42.5 | 8.3 |
| 16 | $Mo_{12}P_1Nb_{10}Bi_1O_{65}$ | 35.8 | 39.9 | 6.4 |
| 17 | $Mo_{12}P_5Nb_1Bi_1O_{52.5}$ | 21.2 | 53.1 | 7.9 |
| 18 | $Mo_{12}P_1Nb_2Bi_2O_{46.5}$ | 91.3 | 63.8 | 7.5 |
| 19 | $Mo_{12}P_1Nb_{0.5}Bi_{0.5}O_{40.5}$ | 84.4 | 62.8 | 5.1 |
| 20 | $Mo_{12}P_1Nb_3Fe_1O_{47.5}$ | 85.4 | 70.1 | 10.3 |
| 21 | $Mo_{12}P_1Nb_1Fe_3O_{45.5}$ | 74.2 | 76.6 | 8.9 |
| 22 | $Mo_{12}P_3Nb_1Fe_1O_{47.5}$ | 59.3 | 72.7 | 6.7 |
| 23 | $Mo_{12}P_1Nb_1Fe_1O_{42.5}$ | 89.2 | 70.3 | 5.4 |
| 24 | $Mo_{12}P_1Nb_9Fe_1O_{62.5}$ | 54.3 | 39.3 | 13.2 |
| 25 | $Mo_{12}P_1Nb_1Fe_9O_{54.5}$ | 43.9 | 41.3 | 10.1 |
| 26 | $Mo_{12}P_5Nb_1Fe_1O_{52.5}$ | 23.1 | 56.3 | 8.9 |
| 27 | $Mo_{12}P_1Nb_1Ni_3O_{44}$ | 81.1 | 69.1 | 7.2 |
| 28 | $Mo_{12}P_1Nb_1Ni_1O_{42}$ | 88.7 | 68.9 | 5.8 |
| 29 | $Mo_{12}P_1Nb_1Mg_3O_{44}$ | 81.4 | 72.3 | 10.1 |
| 30 | $Mo_{12}P_1Nb_1Mg_1O_{42}$ | 92.1 | 68.3 | 4.7 |
| 31 | $Mo_{12}P_1Nb_{0.5}Fe_{0.5}O_{40.5}$ | 79.5 | 67.3 | 8.8 |
| 32 | $Mo_{12}P_{0.5}Nb_1Fe_1O_{41.3}$ | 82.8 | 72.4 | 8.5 |
| 33 | $Mo_{12}P_1Nb_1Sn_3O_{47}$ | 85.6 | 63.2 | 4.3 |
| 34 | $Mo_{12}P_1Nb_1Sn_1O_{43}$ | 89.3 | 65.7 | 3.8 |
| 35 | $Mo_{12}P_1Nb_{0.5}Sn_{0.5}O_{40.8}$ | 84.7 | 60.1 | 5.7 |
| 36 | $Mo_{12}P_1Nb_1W_3O_{50}$ | 73.5 | 62.1 | 4.4 |
| 37 | $Mo_{12}P_1Nb_1W_1O_{44}$ | 81.2 | 68.3 | 4.3 |
| 38 | $Mo_{12}P_1Nb_{0.5}W_{0.5}O_{41.3}$ | 78.3 | 66.7 | 5.6 |
| 39 | $Mo_{12}P_1Nb_1Fe_1Ni_1O_{43.5}$ | 70.1 | 54.6 | 6.3 |
| 40 | $Mo_{12}P_1Nb_1Ni_1Sn_1O_{44}$ | 65.3 | 60.3 | 5.2 |
| 41 | $Mo_{12}P_1Nb_1Bi_1Fe_1O_{44}$ | 85.3 | 68.4 | 7.1 |
| 42 | $Mo_{12}P_1Nb_1Bi_1Ni_1O_{43.5}$ | 84.6 | 65.2 | 6.8 |
| 43 | $Mo_{12}P_1Nb_1Bi_1Mg_1O_{43.5}$ | 88.7 | 66.4 | 8.3 |
| 44 | $Mo_{12}P_1Nb_1Bi_1Sn_1O_{44.5}$ | 87.5 | 62.3 | 5.6 |
| 45 | $Mo_{12}P_1Nb_1Bi_1W_1O_{45.5}$ | 80.5 | 66.3 | 6.7 |

EXAMPLES 46–56

Catalysts obtained in Examples 11~14, 18~19, 23, 28, 30, 34 and 37, respectively, were used. The catalysts were used in the oxidation of acrolein under the same conditions as those employed in Example 11, except that the reaction temperature was 350°C. The results obtained were given in Table 5:

Table 5

| Ex. Nos. | Catalysts | Acrolein conversion (%) | Acrylic acid selectivity (%) | Acetic acid selectivity (%) |
|---|---|---|---|---|
| 46 | $Mo_{12}P_1Nb_1Bi_1O_{42.5}$ | 91.3 | 82.4 | 3.4 |
| 47 | $Mo_{12}P_1Nb_1Bi_3O_{45.5}$ | 85.1 | 78.7 | 4.2 |
| 48 | $Mo_{12}P_1Nb_3Bi_1O_{47.5}$ | 78.2 | 83.5 | 3.1 |
| 49 | $Mo_{12}P_3Nb_1Bi_1O_{47.5}$ | 52.6 | 81.6 | 2.7 |
| 50 | $Mo_{12}P_1Nb_2Bi_2O_{46.5}$ | 89.4 | 76.3 | 3.8 |
| 51 | $Mo_{12}P_1Nb_{0.5}Bi_{0.5}O_{40.5}$ | 81.9 | 80.1 | 2.9 |
| 52 | $Mo_{12}P_1Nb_1Fe_1O_{42.5}$ | 91.5 | 82.3 | 4.5 |
| 53 | $Mo_{12}P_1Nb_1Ni_1O_{42}$ | 87.4 | 85.7 | 3.2 |
| 54 | $Mo_{12}P_1Nb_1Mg_1O_{42}$ | 93.2 | 80.1 | 5.6 |
| 55 | $Mo_{12}P_1Nb_1Sn_1O_{43}$ | 85.2 | 75.4 | 7.8 |
| 56 | $Mo_{12}P_1Nb_1W_1O_{44}$ | 86.3 | 73.5 | 5.9 |

EXAMPLE 57

23.1 grams of 85% orthophosphoric acid dissolved in 50 ml of water were added, under stirring, to the liquid in which were dissolved by heating 423.9 grams of ammonium paramolybdate in 500 ml of water. 100 ml of concentration nitric acid were added to the mixture liquid above and then, 44.2 grams of tantalum pentoxide suspended in 200 ml of nitric acid (aqueous solution) (1:1) were added to the resulting liquid. Then, the resulting mixture liquid was concentrated by heating under stirring, followed by drying of the resulting slurry at 120°C for 24 hours. Thereafter, the dried product was calcined at 400°C for 6 hours, whereby a solid having the following atomic ratio of elements was obtained.

$$Mo_{12}P_1Ta_1O_{41}$$

Said solid was sieved to collect a catalyst within the range of 35 to 100 mesh size. The aforementioned U-shaped reactor was filled with 4 ml of the obtained catalyst. The reactor was put into the molten salt bath heated at 330°C. A reactant gaseous mixture composed of 5% of methacrolein, 9% of oxygen, 32% of steam and 54% of nitrogen, the percentages being by volume, was passed through the reactor with a contact time of 2 seconds. The following results were obtained:

The conversion of methacrolein: 81.2%
The selectivity of methacrylic acid: 64.5%
The selectivity of acetic acid: 6.3%

EXAMPLES 58~61

Catalysts were prepared in the similar way to that of Example 57, except that the starting materials were adjusted so as to maintain the atomic ratios given in Table 6. The catalysts were used in the oxidation of methacrolein under substantially the same conditions as those employed in Example 57. The results obtained were given in Table 6:

Table 6

| Ex. Nos. | Catalysts | Methacrolein conversion (%) | Methacrylic acid selectivity (%) | Acetic acid selectivity (%) |
|---|---|---|---|---|
| 58 | $Mo_{12}P_1Ta_3O_{46}$ | 85.2 | 49.9 | 10.3 |
| 59 | $Mo_{12}P_3Ta_1O_{46}$ | 52.1 | 59.6 | 7.7 |
| 60 | $Mo_{12}P_1Ta_{0.5}O_{39.8}$ | 80.3 | 50.7 | 6.3 |
| 61 | $Mo_{12}P_{0.5}Ta_1O_{39.8}$ | 82.4 | 47.4 | 8.2 |

REFERENCE EXAMPLES 6~13

Catalysts were prepared in the similar way to that of Example 57, except that the starting materials were adjusted so as to maintain the atomic ratios given in Table 7. As a tin component, tin oxide; as magnesium and nickel components, nitrates thereof are used, respectively. The catalysts were used in the oxidation of methacrolein under substantially the same conditions as those employed in Example 57. The results obtained were given in Table 7:

Table 7

| Ref. ex. Nos. | Catalysts | Methacrolein conversion (%) | Methacrylic acid selectivity (%) | Acetic acid selectivity (%) |
|---|---|---|---|---|
| 6 | $Mo_{12}Ta_1O_{38.5}$ | 33.1 | 23.4 | 5.3 |
| 7 | $Mo_{12}P_1O_{38.5}$ | 46.2 | 31.3 | 5.7 |
| 8 | $Mo_{12}Ta_1Fe_1O_{40}$ | 55.4 | 13.7 | 6.9 |
| 9 | $Mo_{12}Ta_1Sn_1O_{40.5}$ | 9.6 | 62.8 | 11.7 |
| 10 | $Mo_{12}P_1Sn_1O_{40.5}$ | 59.1 | 10.2 | 14.5 |
| 11 | $Mo_{12}P_1Ni_1O_{39.5}$ | 43.7 | 15.4 | 12.8 |
| 12 | $Mo_{12}P_1Mg_1O_{39.5}$ | 39.4 | 17.5 | 9.9 |
| 13 | $Mo_{12}Ni_1Mg_1O_{38}$ | 15.7 | 40.3 | 5.3 |

EXAMPLE 62

23.1 grams of 85% orthophosphoric acid dissolved in 50 ml of water were added, under stirring, to the liquid in which were dissolved by heating 423 grams of ammonium paramolybdate in 500 ml of water. 100 ml of concentration nitric acid were added to the mixture liquid above and then, 44.2 grams of tantalum pentoxide suspended in 200 ml of nitric acid aqueous solution (1:1) were added to the resulting liquid on heating under stirring, followed by adding 80.8 grams of ferric nitrate dissolved in 100 ml of water therein. Then, the resulting mixture liquid was concentrated by heating under stirring, followed by drying of the resulting slurry at 120°C for 24 hours. Thereafter, the dried product was calcined at 400°C for 6 hours, whereby a solid having the following atomic ratio of elements was obtained.

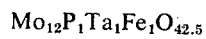

$$Mo_{12}P_1Ta_1Fe_1O_{42.5}$$

Said solid was sieved to collect a catalyst within the range of 35~100 mesh size. The catalyst was used in the oxidation of methacrolein under substantially the same conditions as those employed in Example 57. The following results were obtained:

The conversion of methacrolein: 90.1%
The selectivity of methacrylic acid: 63.4%
The selectivity of acetic acid: 9.2%

EXAMPLES 63~86

Catalysts were prepared in the similar way to that of Example 62, except that the starting materials were adjusted so as to maintain the atomic ratios given in Table 8. As iron, magnesium and nickel components, nitrates thereof; as a tin component, oxide thereof and as a tungsten, ammonium tungstate were used, respectively. The catalysts were used in the oxidation of methacrolein under substantially the same conditions as those employed in Example 62. The results obtained were given in Table 8:

Table 8

| Example Nos. | Catalysts | Methacrolein conversion (%) | Methacrylic acid selectivity (%) | Acetic acid selectivity (%) |
|---|---|---|---|---|
| 63 | $Mo_{12}P_1Ta_3Fe_1O_{47.5}$ | 85.6 | 53.4 | 12.2 |
| 64 | $Mo_{12}P_1Ta_1Fe_3O_{50.5}$ | 79.4 | 59.3 | 9.6 |
| 65 | $Mo_{12}P_3Ta_1Fe_1O_{47.5}$ | 59.6 | 63.7 | 7.0 |
| 66 | $Mo_{12}P_1Ta_9Fe_1O_{57.5}$ | 55.5 | 39.8 | 14.5 |
| 67 | $Mo_{12}P_1Ta_1Fe_9O_{54.5}$ | 44.1 | 41.1 | 9.2 |
| 68 | $Mo_{12}P_5Ta_1Fe_1O_{52.5}$ | 22.2 | 54.1 | 7.6 |
| 69 | $Mo_{12}P_1Ta_1Sn_3O_{47}$ | 81.0 | 57.2 | 5.2 |
| 70 | $Mo_{12}P_1Ta_1Sn_1O_{43}$ | 87.9 | 53.1 | 11.8 |
| 71 | $Mo_{12}P_1Ta_1W_3O_{50}$ | 80.4 | 60.6 | 8.7 |
| 72 | $Mo_{12}P_1Ta_1W_1O_{44}$ | 90.5 | 54.3 | 13.2 |
| 73 | $Mo_{12}P_1Ta_{0.5}Fe_{0.5}O_{40.5}$ | 77.2 | 52.4 | 6.5 |
| 74 | $Mo_{12}P_{0.5}Ta_1Fe_1O_{41.3}$ | 82.7 | 51.3 | 7.5 |
| 75 | $Mo_{12}P_1Ta_1Ni_3O_{44}$ | 85.4 | 57.3 | 10.1 |
| 76 | $Mo_{12}P_1Ta_1Ni_1O_{42}$ | 89.7 | 57.3 | 9.4 |
| 77 | $Mo_{12}P_1Ta_1Mg_3O_{44}$ | 82.1 | 58.9 | 6.7 |
| 78 | $Mo_{12}P_1Ta_1Mg_1O_{42}$ | 88.4 | 58.7 | 5.4 |
| 79 | $Mo_{12}P_1Ta_1Ni_{0.5}O_{41.5}$ | 80.3 | 59.4 | 5.6 |
| 80 | $Mo_{12}P_1Ta_1Mg_{0.5}O_{41.5}$ | 79.9 | 61.3 | 7.8 |
| 81 | $Mo_{12}P_1Ta_3Ni_1O_{47}$ | 83.7 | 60.0 | 4.3 |
| 82 | $Mo_{12}P_1Ta_3Mg_1O_{47}$ | 81.5 | 53.2 | 8.5 |
| 83 | $Mo_{12}P_1Ta_1Fe_1W_1O_{45.5}$ | 78.5 | 58.3 | 3.2 |
| 84 | $Mo_{12}P_1Ta_1Sn_1W_1O_{46}$ | 75.2 | 52.1 | 7.7 |
| 85 | $Mo_{12}P_1Ta_1Mg_1Ni_1O_{43}$ | 69.3 | 65.4 | 7.4 |
| 86 | $Mo_{12}P_1Ta_1Mg_1Sn_1O_{44}$ | 72.7 | 56.5 | 8.1 |

EXAMPLES 87~92

Catalysts obtained in Examples 57, 62, 70, 72, 76 and 78, respectively, were used. The catalysts were used in the oxidation of acrolein under substantially the same conditions as those employed in Example 1, except that the reaction temperature was 365°C. The results obtained were given in Table 9:

Table 9

| Ex. Nos. | Catalysts | Acrolein conversion (%) | Acrylic acid selectivity (%) | Acetic acid selectivity (%) |
|---|---|---|---|---|
| 87 | $Mo_{12}P_1Ta_1O_{31}$ | 95.3 | 76.2 | 7.6 |
| 88 | $Mo_{12}P_1Ta_1Fe_1O_{42.5}$ | 89.8 | 81.3 | 5.3 |
| 89 | $Mo_{12}P_1Ta_1W_1O_{44}$ | 92.4 | 85.7 | 4.4 |
| 90 | $Mo_{12}P_1Ta_1Sn_1O_{43}$ | 90.3 | 83.4 | 8.7 |
| 91 | $Mo_{12}P_1Ta_1Ni_1O_{42}$ | 93.4 | 62.7 | 5.7 |
| 92 | $Mo_{12}P_1Ta_1Mg_1O_{42}$ | 91.5 | 63.9 | 4.5 |

EXAMPLE 93

23.1 grams of 85% orthophosphoric acid dissolved in 50 ml of water were added, under stirring, to the liquid in which were dissolved 423 grams of ammonium paramolybdate in 700 ml of water. 37.9 grams of titanium tetrachloride, $TiCl_4$, dissolved in 200 ml of hydrochloric acid (1:1) were added all at once to the resulting liquid under stirring. Then, the resulting mixture liquid was evaporated by heating under stirring, followed by drying of the resulting cake at 120°C for 16 hours. Thereafter, the dried product was calcined at 400°C for 12 hours, whereby a solid having the atomic ratio of elements was obtained.

$$Mo_{12}P_1Ti_1O_{40.5}$$

Said solid was sieved to collect a catalyst within the range of 35~100 mesh size. The aforementioned U-shaped reactor was filled with 4 ml of the obtained catalyst. The reactor was put in the molten salt bath heated at 330°C. A reactant gaseous mixture composed of 5% of methacrolein, 9% of oxygen, 32% of steam and 54% of nitrogen, the percentages being by volume, was passed through the reactor with a contact time of 2 seconds. The following results were obtained:

The conversion of methacrolein: 72.3%
The selectivity of methacrylic acid: 53.7%
The selectivity of acetic acid: 8.4%

REFERENCE EXAMPLES 14-15

Catalysts were prepared in the similar way to that of Example 93, except that the starting materials were adjusted so as to maintain the atomic ratios given in Table 10. The catalysts were used in the oxidation of methacrolein under substantially the same conditions as those employed in Example 93. The results obtained were given in Table 10:

Table 10

| Ref. ex. Nos. | Catalysts | Methacrolein conversion (%) | Methacrylic acid selectivity (%) | Acetic acid selectivity (%) |
|---|---|---|---|---|
| 14 | $Mo_{12}Ti_1O_{38}$ | 23.1 | 18.3 | 4.8 |
| 15 | $Mo_{12}P_1O_{38.5}$ | 26.3 | 32.4 | 3.7 |

EXAMPLE 94

23.1 grams of 85% of orthophosphoric acid dissolved in 50 ml of water were added, under stirring, to the liquid in which were dissolved 423 grams of ammonium paramolybdate in 700 ml of water. 37.9 grams of titanium tetrachloride dissolved in 200 ml of hydrochloric acid (1:1) were added all at once to the resulting liquid under stirring, followed by adding 44.2 grams of tantalum pentoxide, $Ta_2O_5$, suspended in 200 ml of nitric acid (1:1) therein. Then, the resulting mixture liquid was evaporated by heating under stirring, followed by drying of the resulting cake at 120°C for 16 hours. Thereafter, the dried product was calcined at 400°C for 12 hours, whereby a solid having the atomic ratio of elements was obtained.

$$Mo_{12}P_1Ti_1Ta_1O_{43}$$

Said solid was sieved to collect a catalyst within the range of 35~100 mesh size. The aforementioned U-shaped reactor was filled with 4 ml of the obtained catalyst. The oxidation of methacrolein was conducted under substantially the same conditions as those employed in Example 93. The following results were obtained:

The conversion of methacrolein: 86.3%
The selectivity of methacrylic acid: 67.5%
The selectivity of acetic acid: 8.1%

EXAMPLES 95~96

Catalysts were prepared in the similar way to that of Example 93, except that 26.6 grams of niobium pentoxide, $Nb_2O_5$, or 30.1 grams of tin oxide, $SnO_2$, were used instead of tantalum, and all the starting materials were adjusted so as to maintain the atomic ratios given in Table 11. The catalysts were used in the oxidation of methacrolein under substantially the same conditions as those employed in Example 93. The results obtained were given in Table 11.

Table 11

| Ex. Nos. | Catalysts | Methacrolein conversion (%) | Methacrylic acid selectivity (%) | Acetic acid selectivity (%) |
|---|---|---|---|---|
| 95 | $Mo_{12}P_1Ti_1Nb_1O_{43}$ | 96.2 | 55.9 | 12.1 |
| 96 | $Mo_{12}P_1Ti_1Sn_1O_{42.5}$ | 86.4 | 53.7 | 13.5 |

REFERENCE EXAMPLES 16~17

Catalysts were prepared in the similar way to that of Example 94, except that the starting materials were adjusted so as to maintain the atomic ratios given in Table 12. The catalysts were used in the oxidation of methacrolein under the same conditions as those employed in Example 94. The results obtained were given in Table 12:

Table 12

| Ref. ex. Nos. | Catalysts | Methacrolein conversion (%) | Methacrylic acid selectivity (%) | Acetic acid selectivity (%) |
|---|---|---|---|---|
| 16 | $Mo_{12}Ti_1Ta_1O_{40.5}$ | 23.8 | 18.5 | 9.3 |
| 17 | $Mo_{12}Ti_1Nb_1O_{40.5}$ | 31.4 | 21.7 | 8.6 |

EXAMPLES 97–100

Catalysts obtained in Examples 93–96 were used, respectively, for the oxidation of acrolein under substantially the same conditions as those employed in Example 93, except that the reaction temperature was 360°C. The results obtained were given in Table 13:

Table 13

| Ex. Nos. | Catalysts | Acrolein conversion (%) | Acrylic acid selectivity (%) | Acetic acid selectivity (%) |
|---|---|---|---|---|
| 97 | $Mo_{12}P_1Ti_1O_{40.5}$ | 83.2 | 65.7 | 4.8 |
| 98 | $Mo_{12}P_1Ti_1Ta_1O_{43}$ | 91.8 | 76.6 | 5.3 |
| 99 | $Mo_{12}P_1Ti_1Nb_1O_{43}$ | 92.4 | 75.0 | 4.9 |
| 100 | $Mo_{12}P_1Ti_1Sn_1O_{42.5}$ | 90.3 | 70.1 | 7.5 |

EXAMPLES 101–104

Catalysts were prepared in the similar way to that of Example 93, except that the starting materials were adjusted so as to maintain the atomic ratios given in Table 14. The catalysts were used in the oxidation of methacrolein under the same conditions as those employed in Example 93. The results obtained were given in Table 14:

Table 14

| Ex. Nos. | Catalysts | Methacrolein conversion (%) | Methacrylic acid selectivity (%) | Acetic acid selectivity (%) |
|---|---|---|---|---|
| 101 | $Mo_{12}P_1Ti_3O_{44.5}$ | 81.3 | 47.6 | 11.2 |
| 102 | $Mo_{12}P_3Ti_1O_{45.5}$ | 45.0 | 69.2 | 8.4 |
| 103 | $Mo_{12}P_1Ti_{0.5}O_{39.5}$ | 71.6 | 55.7 | 7.3 |
| 104 | $Mo_{12}P_{0.5}Ti_1O_{39.3}$ | 80.8 | 49.0 | 9.3 |

EXAMPLES 105–112

Catalysts were prepared in the similar way to that of Example 94, except that the starting materials were adjusted so as to maintain the atomic ratios given in Table 15. The catalysts were used for the oxidation of acrolein under substantially the same conditions as those employed in Example 94. The results obtained were given in Table 15:

Table 15

| Ex. Nos. | Catalysts | Acrolein conversion (%) | Acrylic acid selectivity (%) | Acetic acid selectivity (%) |
|---|---|---|---|---|
| 105 | $Mo_{12}P_1Ti_3Ta_1O_{47}$ | 84.7 | 69.2 | 11.1 |
| 106 | $Mo_{12}P_1Ti_1Ta_3O_{48}$ | 78.3 | 75.8 | 8.5 |
| 107 | $Mo_{12}P_3Ti_1Ta_1O_{48}$ | 58.5 | 74.0 | 6.9 |
| 108 | $Mo_{12}P_1Ti_9Ta_1O_{59}$ | 54.4 | 38.7 | 13.4 |
| 109 | $Mo_{12}P_1Ti_1Ta_9O_{63}$ | 43.0 | 40.2 | 10.3 |
| 110 | $Mo_{12}P_9Ti_1Ta_1O_{53}$ | 23.3 | 55.0 | 8.7 |
| 111 | $Mo_{12}P_1Ti_{0.5}Ta_{0.5}O_{40.8}$ | 78.3 | 69.4 | 7.7 |
| 112 | $Mo_{12}P_{0.5}Ti_1Ta_1O_{41.8}$ | 83.8 | 72.2 | 8.0 |

EXAMPLES 113–119

Catalysts were prepared in the similar way to that of Example 93, except that the starting materials were adjusted so as to maintain the atomic ratios given in Table 16. The catalysts were used for the oxidation of methacrolein under substantially the same conditions as those employed in Example 93. The results obtained were given in Table 16:

Table 16

| Example Nos. | Catalysts | Methacrolein conversion (%) | Acrylic acid selectivity (%) | Acetic acid selectivity (%) |
|---|---|---|---|---|
| 113 | $Mo_{12}P_1Ti_3Ta_1O_{47}$ | 89.8 | 44.4 | 10.3 |
| 114 | $Mo_{12}P_1Ti_1Ta_3O_{48}$ | 78.1 | 53.7 | 8.2 |
| 115 | $Mo_{12}P_3Ti_1Ta_1O_{48}$ | 28.3 | 76.8 | 6.0 |
| 116 | $Mo_{12}P_1Ti_{0.5}Ta_{0.5}O_{40.8}$ | 76.6 | 63.9 | 8.6 |
| 117 | $Mo_{12}P_1Ti_3Sn_1O_{46.5}$ | 93.5 | 42.1 | 9.7 |
| 118 | $Mo_{12}P_1Ti_1Sn_3O_{46.5}$ | 92.0 | 43.6 | 11.8 |
| 119 | $Mo_{12}P_3Ti_1Sn_1O_{47.5}$ | 31.2 | 64.5 | 7.5 |

What we claimed is:

1. A process for preparing acrylic acid or methacrylic acid which comprises reacting acrolein or methacrolein with molecular oxygen in vapor phase at a temperature of from 250° to 450°C, in the presence of a catalyst consisting essentially of (a) molybdenum, (b) phosphorus, (c) at least one element selected from the group consisting of niobium, tantalum and titanium, and (d) oxygen.

2. A process as set forth in claim 1, wherein said catalysts having the empirical formula:

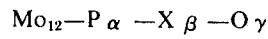

$$Mo_{12}-P\alpha -X\beta -O\gamma$$

wherein X is at least one element selected from the group consisting of niobium, tantalum and titanium, $\alpha$ is a number of 0.1 to 5, $\beta$ is a number of 0.1 to 10, $\gamma$ is a number of 36 to 81.

3. A process for preparing acrylic acid or methacrylic acid which comprises reacting acrolein or methacrolein with molecular oxygen in vapor phase at a temperature of from about 250° to about 450°C, in the presence of a catalyst consisting essentially of (a) molybdenum (b) phosphorus, (c) at least one element selected from the group consisting of niobium, tantalum and titanium, (d) oxygen and (e) a member selected from the group consisting of tin, magnesium, tungsten, tin and magnesium, tin and tungsten, iron and tungsten, and magnesium and nickel.

4. A process as set forth in claim 3, wherein said catalysts having the empirical formula:

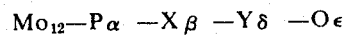

wherein X is at least one element selected from the group consisting of niobium, tantalum and titanium; Y is a member selected from the group consisting of tin, magnesium, tungsten, tin and magnesium, tin and tungsten, iron and tungsten, and magnesium and nickel; $\alpha$ is a number of 0.1 to 5; $\beta$ is a number of 0.1 to 10; $\delta$ is a number of 0.1 to 10 and $\epsilon$ is a number of 38 to 111.

5. A process as set forth in claim 1, wherein said catalysts are prepared by concentrating a solution or suspension containing requested components, drying the resulting concentrate, calcining the dried product at a temperature of from 250° to 450°C, for 1 to 48 hours in air, and grinding into the desired size.

6. A process as set forth in claim 5, wherein as the source of molybdenum component, being one of said requested components, ammonium paramolybdates are used.

7. A process as set forth in claim 5, wherein as a common source for molybdenum and phosphorus components, being two of said requested components, phosphomolybdate is used.

* * * * *